(12) United States Patent
Abe

(10) Patent No.: US 6,272,123 B1
(45) Date of Patent: Aug. 7, 2001

(54) VARIABLE RATE CDMA TRANSMITTER-RECEIVER AND TRANSMISSION METHOD

(75) Inventor: Masami Abe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/055,401

(22) Filed: Apr. 6, 1998

(30) Foreign Application Priority Data

Jun. 3, 1997 (JP) .................................................. 9-144804

(51) Int. Cl.[7] .............................................. H04J 13/00
(52) U.S. Cl. .......................................... 370/342; 370/465
(58) Field of Search ...................... 370/342, 465; 714/774

(56) References Cited

U.S. PATENT DOCUMENTS

| | | | |
|---|---|---|---|
| 5,416,787 | * | 5/1995 | Kodama et al. ........................ 371/43 |
| 5,659,579 | * | 8/1997 | Herzberg ............................... 375/262 |
| 5,761,223 | * | 6/1998 | Ando et al. ............................. 371/41 |
| 5,953,324 | * | 9/1999 | Adachi ................................... 370/331 |
| 6,009,553 | * | 12/1999 | Martinez et al. ....................... 714/784 |

* cited by examiner

Primary Examiner—Melvin Marcelo
(74) Attorney, Agent, or Firm—Rabin & Champagne, P.C.

(57) ABSTRACT

A CDMA transmitter-receiver capable of varying a transmission rate of a voice signal coded on a sample by sample basis. A voice encoder encodes, on a sample by sample basis, a voice signal to be transmitted. An information distributor divides a coded digital signal, and supplies the divided parts to an error correcting encoder and an interleaver in accordance with transmission rate information so that the number of bits to be subjected to the error correcting coding varies in response to a transmission rate the transmission rate information indicates, thereby varying the total number of transmitted bits. Digital signals with and without subjected to the error correcting coding are transmitted to a party through components from the interleaver to an RF transmitting stage. A transmission power controller controls the transmission power of an RF transmitted signal output from the RF transmitting stage in response to the transmission rate information fed from the controller.

14 Claims, 3 Drawing Sheets

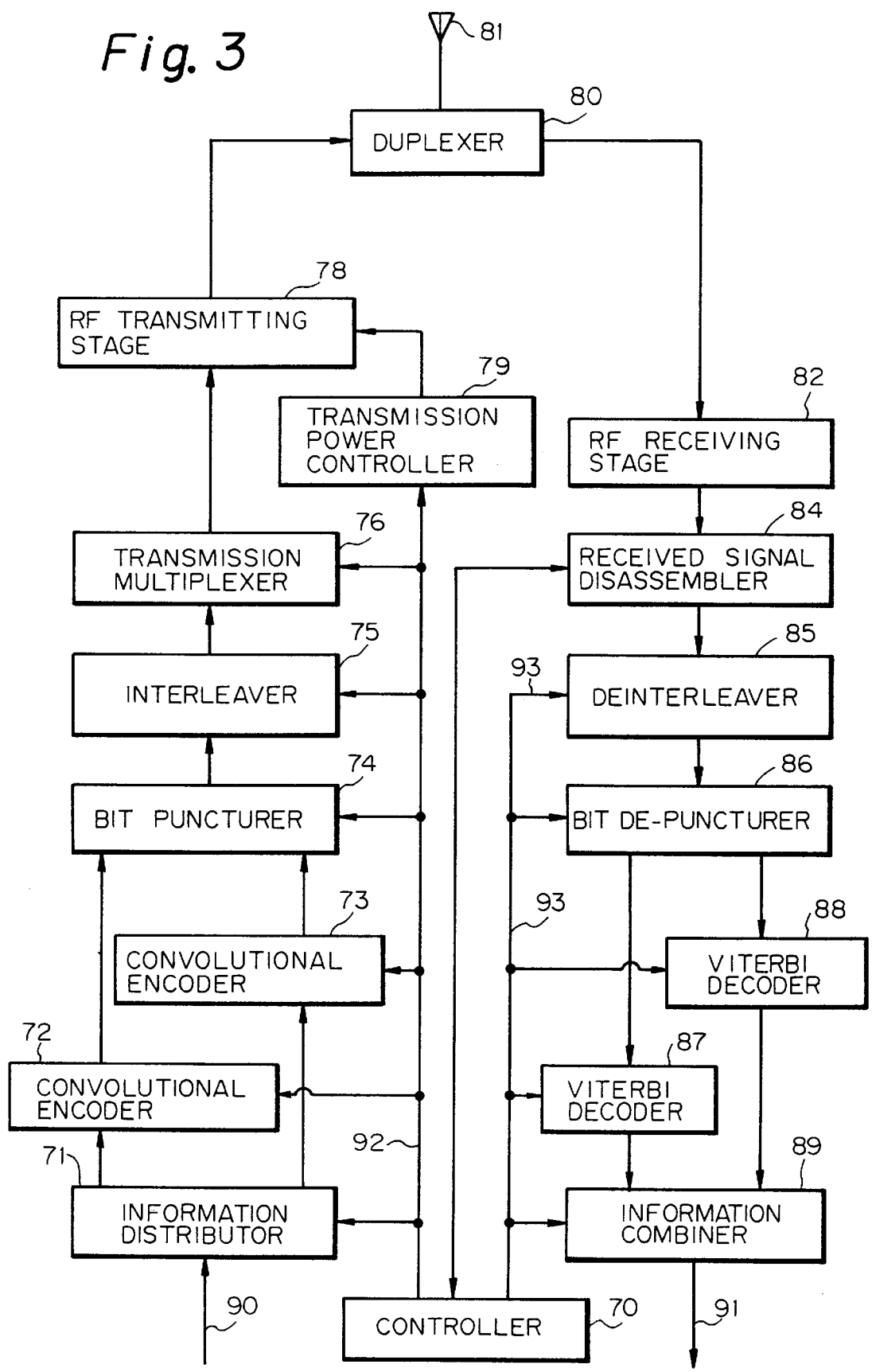

VARIABLE RATE CDMA TRANSMITTER-RECEIVER AND TRANSMISSION METHOD

BACKGROUND OF THE INVENTION

1. Field of the Invention

The present invention relates to a CDMA (Code Division Multiple Access) transmitter-receiver capable of varying a transmission rate.

2. Description of the Background Art

A CDMA communication system must minimize transmission power per channel to increase its capacity in terms of the number of subscribers because they communicate using the same frequency band.

A conventional CDMA system like that recommended in the United States (IS-95) varies the transmission rate per channel by applying to voice encoding a block coding scheme that varies the bit rate of the voice encoding, and controls the transmission power in accordance with the transmission rate.

Such a conventional CDMA system has a drawback of being inapplicable to the voice encoding without using the block coding such as PCM (Pulse Code Modulation) and ADPCM (Adaptive Differential PCM). In addition, the block coding of the conventional CDMA system requires very complicated coding and decoding.

SUMMARY OF THE INVENTION

It is therefore an object of the present invention to provide a CDMA transmitter-receiver capable of varying the transmission rate of the voice encoding on a sample by sample basis, thereby eliminating the drawbacks of the conventional technique.

To solve the foregoing problems, according to an aspect of the present invention, there is provided a CDMA transmitter-receiver comprising: a voice encoder for encoding an input voice signal on a sample by sample basis; an information distributor for splitting a signal encoded by the voice encoder into first bits to be subjected to error correcting coding and second bits not to be subjected to error correcting coding; an error correcting encoder for carrying out the error correcting coding of the first bits; and a controller for generating transmission rate information indicative of a number of transmitted bits, wherein the information distributor varies the number of the first bits in accordance with the number of transmitted bits indicated by the transmission rate information.

According to another aspect of the present invention, there is provided a CDMA transmitter-receiver comprising: a plurality of error correcting encoders for carrying out error correcting coding of input data, the plurality of error correcting encoders having different error correcting capabilities; a selector for selecting one of the plurality of error correcting encoders; and a controller for generating transmission rate information indicative of a number of transmitted bits, wherein the selector brings the selected one of the plurality of error correcting encoders into operation for a transmitted bit sequence designated by the transmission rate information.

BRIEF DESCRIPTION OF THE DRAWINGS

The objects and features of the present invention will become more apparent from the consideration of the following detailed description taken in conjunction with the accompanying drawings in which:

FIG. 3 is a further schematic block diagram showing a further alternative embodiment of a transmitter-receiver in accordance with the present invention.

DESCRIPTION OF THE PREFERRED EMBODIMENTS

The invention will now be described with reference to the accompanying drawings.

Figure 1:
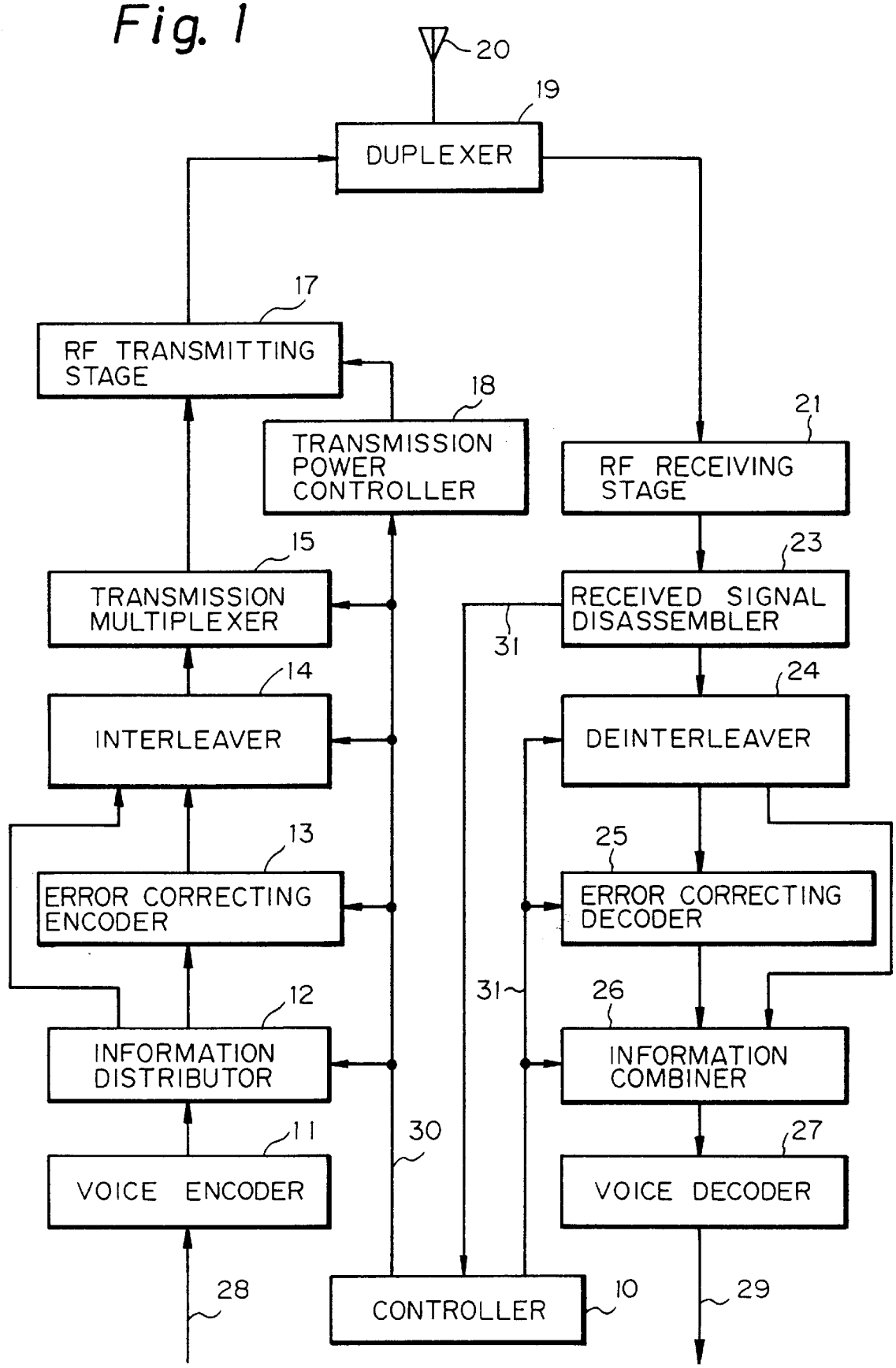
FIG. 1 is a schematic block diagram showing an embodiment of a transmitter-receiver in accordance with the present invention.

Referring to FIG. 1, this system limits the total number of transmitted bits by reducing the number of bits to be subjected to the error correcting coding in accordance with a transmission rate instructed by a base station, when transmitting a voice signal having undergone the error correction, thereby reducing the transmission power.

In FIG. 1, blocks from a voice encoder 11 to transmission power controller 18 constitute a transmitter for transmitting a voice signal 28 to its party in the form of a radio frequency (RF) signal, and blocks from an RF receiving stage 21 to a voice decoder 27 constitute a receiver for receiving the RF signal sent from its party, and outputs a voice signal 29. A duplexer 19 separates the received RF signal from the transmitted RF signal, and a controller 10 controls the entire operation of the system by providing the respective components of the transmitter and receiver with rate information, control signals and the like.

The transmitter will be described in more detail. The voice encoder 11 samples the input voice signal 28 to convert it into a digital signal, and supplies it to an information distributor 12. The conversion from the analog to digital signal can be based on the PCM, ADPCM or other sample-by-sample coding. The information distributor 12 carries out buffering of the digital signal on a block by block basis of the transmitted block (for example, at every 10 ms interval), and splits it into bits to be supplied to an error correcting encoder 13 and bits to be supplied to an interleaver 14 in accordance with transmission rate information 30.

An error correcting encoder 13 performs error correcting coding of the digital signal supplied from the information distributor 12 using block coding or convolutional coding, and outputs it to the interleaver 14. The interleaver 14 interleaves the digital signal from the error correcting encoder 13 and that from the information distributor 12, and supplies an interleaved digital signal to a transmission multiplexer 15.

The transmission multiplexer 15 adds the rate information to the digital signal fed from the interleaver 14, and supplies it to an RF transmitting stage 17. The RF transmitting stage 17 converts the digital signal from the transmission multiplexer 15 into an analog baseband signal, followed by spreading using a spreading code, and power amplification with a transmitting amplifier, and supplies the amplified signal to the duplexer 19 as the transmitted RF signal. The transmission power controller 18 controls the transmission power of the transmitted RF signal output from the RF transmitting stage 17.

Next, the receiver will be described in more detail. The RF receiving stage 21 generates an analog baseband signal by despreading a received RF signal fed from the duplexer 19 using a despreading code, and carries out the A/D conversion of the analog baseband signal into a digital signal. A received signal disassembler 23 extracts received rate information 31 from the digital signal, and supplies the controller 10 with the received rate information 31, and a deinterleaver 24 with the remaining digital signal. Although the received rate information 31 output from the received signal disassembler 23 is supplied to the respective components of the receiver through the controller 10 in FIG. 1, it may be supplied to them directly from the received signal disassembler 23.

The deinterleaver 24 deinterleaves the digital signal fed from the received signal disassembler 23 to recover the digital signal before the interleave, divides it into bits to be supplied to an error correcting decoder 25 and bits to be supplied to an information combiner 26 in accordance with the received rate information 31, and outputs them. The error correcting decoder 25 carries out the error correction of the digital signal fed from the deinterleaver 24, and supplies it to the information combiner 26. The information combiner 26 combines the digital signal fed from the error correcting decoder 25 with that fed from the deinterleaver 24, and supplies the combined digital signal to the voice decoder 27 on a sample by sample basis. The voice decoder 27 decodes it to recover the output voice signal 29.

The functions of the CDMA transmitter-receiver as shown in FIG. 1 can be implemented by processings based on software installed in a DSP (Digital Signal Processor). Part of the processings or the entire processings can be implemented by separate hardware (gate arrays), or accelerators attached to the DSP.

In operation, the controller 10 makes a decision of the transmission rate prior to communication, and supplies the transmission rate information 30 indicative of the transmission rate to respective components of the transmitter. Alternatively, the transmission rate can be decided by negotiation with a party through a control channel at a time when setting a call, or can be successively changed by instructions sent from a base station during communications.

The voice signal 28 fed from a microphone to be sent to the party is input to the voice encoder 11 to be encoded on sample by sample basis. For example, it is sampled at every 8 kHz interval and subjected to the PCM coding, thereby being converted into an 8-bit digital signal. The digital signal is input to the information distributor 12, temporarily stored in its internal buffer at every transmitted block interval (10 Ms, for example), and is divided into bits to be delivered to the error correcting encoder 13 and bits to be delivered to the interleaver 14.

The information distributor 12 carries out the bit separation in accordance with the transmission rate information 30 fed from the controller 10. The MSB (Most Significant Bit) of the digital data representing the voice signal has greater influence on the voice quality than the LSB (Least Significant Bit) thereof. Taking account of this, although the entire bits of the 8-bit digital data representing the voice signal are supplied to the error correcting encoder 13, when the transmission rate information 30 indicates a high rate because the number of simultaneous users of the CDMA system is within a predetermined range, only six bits, for example, beginning from the MSB of the 8-bit digital data are supplied thereto and the remaining two bits are sent to the interleaver 14, when the transmission rate information 30 indicates a low rate because the number of simultaneous users exceeds the predetermined range.

The digital data sent to the error correcting encoder 13 undergoes the error correcting coding using the block code or convolutional code, thereby being provided with a predetermined number of redundant bits to be protected from transmission errors. Thus, the total number of the bits output from the error correcting encoder 13 changes in accordance with the number of bits subjected to the error correcting coding. For example, when the error correcting encoder 13 handles only six bits beginning from the MSB of every 8-bit the voice data, the total number of bits reduces to 6/8 of that when it handles the entire bits thereof. This means that the number of the redundant bits to be added is also reduced by that amount, resulting in the reduction in the total number of bits output from the error correcting encoder 13.

In this way, the present embodiment carries out the error correcting coding of the entire bits of the digital signal output from the voice encoder 11 when there is a enough margin in the capacity in terms of the number of simultaneous users of the CDMA system, whereas it carries out the error correcting coding in part of only more significant bits of the digital data when there remains little margin because of the increase in the number of accesses to the CDMA system, thereby reducing the total number of the transmitted data. This enables the transmission power of the transmitted RF signal to be reduced when there is little margin in the capacity in terms of the number of simultaneous users.

The digital data output from the error correcting encoder 13 and those output from the information distributor 12 are supplied to the interleaver 14 which carries out the interleaving to reduce the effect of burst errors on the error correcting decoding by making random the burst errors occurring on the transmission line. In this case, since the number of bits to be interleaved changes in response to the transmission rate, interleaving suitable to the bit number can be achieved so that the burst errors can be effectively ameliorated. Here, the information on the number of bits to be interleaved can be obtained from the transmission rate information 30 fed from the controller 10.

The interleaver 14 supplies the interleaved digital signal to the transmission multiplexer 15 which adds to it the rate information corresponding to the transmission rate information 30 fed from the controller 10. The rate information, being added to each transmitted block, serves as information on the basis of which the party carries out deinterleaving of the received signal, information separation, etc. The digital data to which the rate information is added are allotted to a plurality of slots and delivered to the RF transmitting stage 17.

In the course of this, the transmission multiplexer 15 divides a transmitted block into 16 slots, each consisting of 0.625 ms, selects the number of slots to be used in accordance with the transmission rate information 30 fed from the controller 10, and assigns to the selected slots the digital data to which the rate information has been added. Such a processing is needed because the number of slots varies in response to the changes in the total number of the transmission bits in accordance with the transmission rate. If the total number of the transmission bits reduces to such an amount that they can be transmitted by the first eight slots, they can be repeated by the remaining eight slots so that the transmission power of the transmitted RF signal can be reduced. In this case, the receiver must have a function to compensate for the degradation in transmission quality due to the reduction in the transmission power by utilizing the repetition of the transmitted data.

Receiving the digital data from the transmission multiplexer 15, the RF transmitting stage 17 converts it to an analog baseband signal of a predetermined frequency, spreads it using a predetermined spreading code, and modulates it to the transmitted RF signal of a predetermined frequency. The transmitted RF signal is power amplified by the transmitted amplifier, and is sent to the party through the duplexer 19 and antenna 20. The transmission power controller 18 controls the transmission power of the transmitted RF signal output from the RF transmitting stage 17 in accordance with the transmission rate information 30 fed from the controller 10 such that it reduces the transmission power when the transmission rate information 30 indicates a low rate. This enables an increasing number of users to access the CDMA system.

On the other hand, accepting the received RF signal received by the antenna 20 through the duplexer 19, the RF receiving stage 21 demodulates it, followed by despreading using a predetermined despreading code, thereby providing an analog baseband signal. The analog baseband signal is converted into a digital signal by an A/D converter, and is supplied to the received signal disassembler 23. The received signal disassembler 23 extracts the rate information from the input digital data, and supplies it to the controller 10 as the received rate information 31. Beside, the received signal disassembler 23 supplies the deinterleaver 24 with the remaining digital data without the rate information.

Receiving the received rate information 31 from the received signal disassembler 23, the controller 10 supplies it to the deinterleaver 24, error correcting decoder 25 and information combiner 26, generates control signals for controlling the respective components on the basis of the received rate information 31, and supplies them to these components. The deinterleaver 24, receiving the digital data from the received signal disassembler 23, deinterleaves them in a procedure opposite to that of the interleaving, thereby regenerating the digital signal before the interleave. The deinterleaver 24 supplies the digital data to the error correcting decoder 25 when they are error correcting coded data, but to the information combiner 26 when they are non-error correcting coded data. This is carried out in accordance with the received rate information 31 fed from the controller 10.

Receiving the digital data from the deinterleaver 24, the error correcting decoder 25 performs the error correcting decoding thereof, thereby correcting the errors occurred during the transmission. The information combiner 26 temporarily stores in its buffer the error correcting decoded digital data fed from the error correcting decoder 25 and the non-error correcting decoded data fed from the deinterleaver 24, and combines them to restore the original digital data in accordance with the received rate information 31 fed from the controller 10. Then, the voice decoder 27 converts the digital data into the voice signal on a sample by sample basis, and supplies it to an external speaker as the voice signal 29.

As described above, the illustrative embodiment is adapted to vary the number of bits to be subjected to the error correcting coding in response to the transmission rate. This enables the total number of transmitted bits to be varied for the input voice coded data on a sample by sample basis. In addition, the present embodiment can apply the simple voice encoding scheme that has been widely used in the conventional systems, whose coding and decoding are simple.

Next, an alternative embodiment of the CDMA transmitter-receiver in accordance with the present invention will be described with reference to FIG. 2. This system comprises a pair of error correcting encoders with different error correcting capability, so that it can reduce, when the number of the simultaneous users increases, the transmission power by suppressing the total number of transmitted bits by selecting the error correcting coder with a lower error correcting capability (that is, with a fewer redundant bits) in response to a command from the base station.

Figure 2:
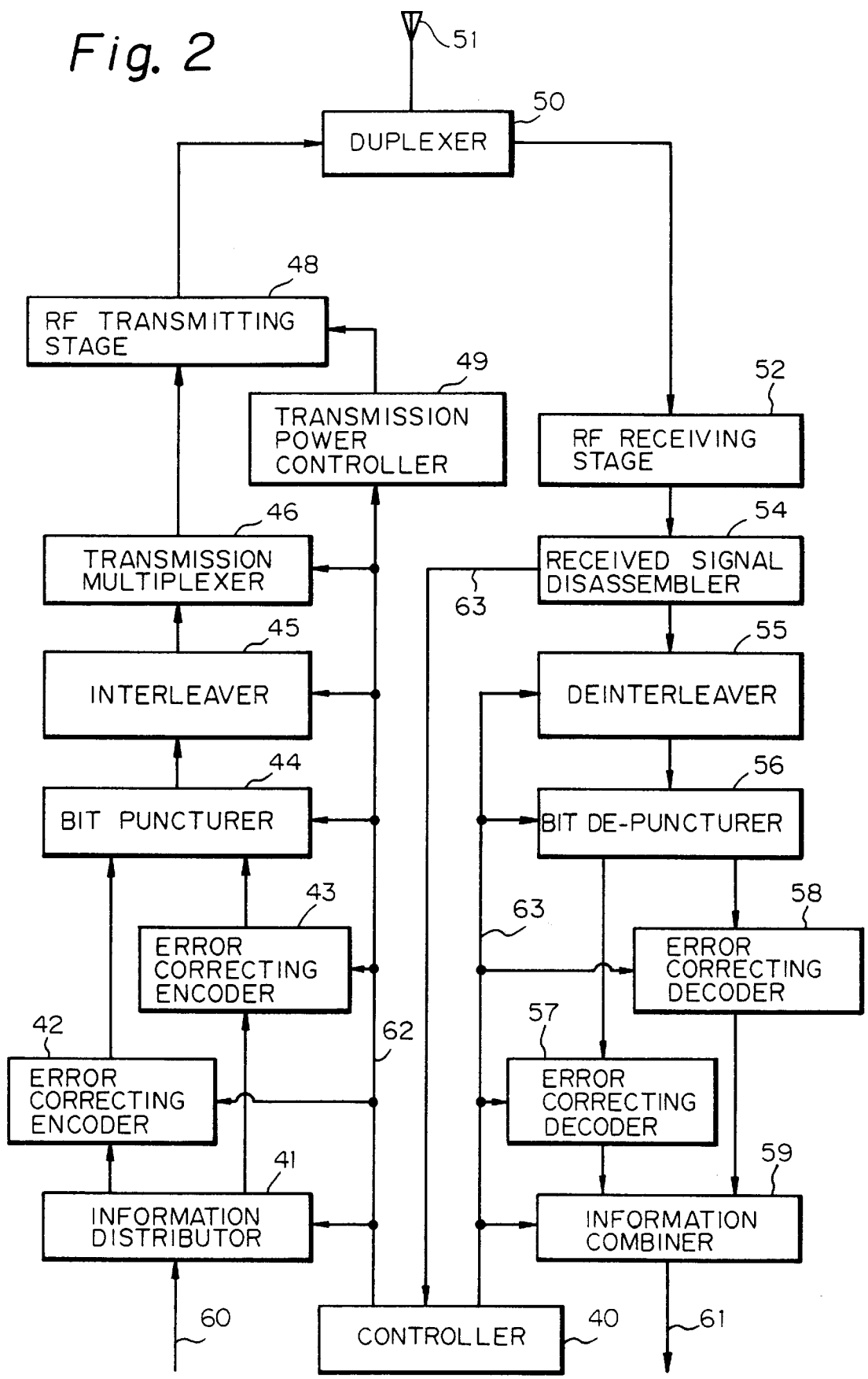
FIG. 2 is also a schematic block diagram showing an alternative embodiment of a transmitter-receiver in accordance with the present invention.

In FIG. 2, blocks from an information distributor 41 to a transmission power controller 49 constitute a transmitter for sending transmitted data 60 to its party in the form of an RF signal, and blocks from an RF receiving stage 52 to an information combiner 59 constitute a receiver for receiving the RF signal sent from its party, and outputs received data 61. A duplexer 50 separates a received RF signal from a transmitted RF signal, and a controller 40 controls the entire operation of the system by providing the respective components of the transmitter and receiver with the rate information, control signals and the like.

The transmitter will be described in more detail. The information distributor 41 carries out buffering of the externally supplied transmitted data 60 on a block by block basis of the transmitted block (for example, at every 10 ms interval), and splits it into bits to be supplied to an error correcting encoder 42 and bits to be supplied to an error correcting encoder 43 in accordance with transmission rate information 62. The error correcting encoders 42 and 43 carry out the error correcting coding of the digital data (transmitted data) fed from the information distributor 41, and supply them to a bit puncturer 44.

The error correcting encoders 42 and 43 differ in their error correcting capability and in the number of added redundant bits from each other. For example, the error correcting encoder 42 carries out the error correcting coding using a convolutional code with a coding rate of $1/3$, and the error correcting encoder 43 carries out the error correcting coding using a convolutional code with a coding rate of $1/2$. Alternatively, the error correcting encoder 42 carries out the error correcting coding using a (63,25) BCH code, and the error correcting encoder 43 carries out the error correcting coding using a (63,55) BCH code.

The bit puncturer 44 decimates in a predetermined procedure the digital signal that has undergone the error correcting coding by the error correcting encoder 42 or 43 to adjust the total number of bits of the digital data to the number of bits determined in advance for the transmitted block, and supplies the decimated data to an interleaver 45. The interleaver 45 performs the interleaving of the digital signal from the bit puncturer 44 in accordance with the transmission rate, and supplies the interleaved digital signal to a transmission multiplexer 46. The transmission multiplexer 46, RF transmitting stage 48 and transmission power controller 49 are the same to the transmission multiplexer 15, RF transmitting stage 17 and transmission power controller 18 as shown in FIG. 1, respectively.

Next, the receiver will be described in more detail. The RF receiving stage 52 and received signal disassembler 54 are the same to the RF receiving stage 21 and received signal disassembler 23 as shown in FIG. 1. A deinterleaver 55 deinterleaves the digital signal fed from the received signal disassembler 54 to recover the digital signal before the interleave, and outputs the deinterleaved digital signal to a bit de-puncturer 56. The bit de-puncturer 56 recovers the digital signals before the decimation by making insertions into locations of the digital signal fed from the deinterleaver 55, at which the decimation has been carried out, and supplies interpolated signals to error correcting decoders 57 and 58.

The error correcting decoders 57 and 58 correct transmission errors by carrying out error correcting decoding of the digital signals fed from the bit de-puncturer 56, and supply them to the information combiner 59. The information combiner 59 combines the digital signals fed from the error correcting decoders 57 and 58, and outputs the combined signal as the received data 61. The functions of the CDMA transmitter-receiver as shown in FIG. 2 can be implemented by software processings in a DSP. Alternatively, part of the processings or the entire processings corresponding to the individual functions can be implemented by separate hardware (gate arrays), or accelerators attached to the DSP.

In operation, the controller 40 makes a decision of the transmission rate prior to communication as in the first embodiment, and supplies the transmission rate information 62 indicative of the transmission rate to respective components of the transmitter. First, the digital data (transmitted data) input to the information distributor 41 are temporarily stored in its internal buffer on a block by block basis of the transmission block (at every 10 ms interval, for example), and are supplied to either the error correcting encoder 42 or error correcting encoder 43 in accordance with the transmission rate information 62 fed from the controller 40.

In the present embodiment, the information distributor 41 is set up such that it supplies the digital data to the error correcting encoder 42 when the transmission rate information indicates a high rate, that is, when there is a margin in the capacity in terms of the number of simultaneous users of the CDMA system, whereas it supplies the digital data to the error correcting encoder 43 when the transmission rate information indicates a low rate, that is, when there is little margin in the capacity. Alternatively, when the transmitted data consist of bit sequences of higher importance and those of lower importance, the information distributor 41 can be set up such that it supplies the bit sequences of higher importance to the error correcting encoder 42, and the bit sequences of lower importance to the error correcting encoder 43.

The digital signal fed to the error correcting encoder 42 undergoes the convolutional coding with a coding rate of $\frac{1}{3}$, while the digital signal fed to the error correcting encoder 43 is subjected to the convolutional coding with a coding rate of $\frac{1}{2}$, for example, so that the data are protected from transmission errors, and the coded signals are supplied to the bit puncturer 44. In this case, the total number of bits output from the error correcting encoder 43 is $\frac{2}{3}$ of that output from the error correcting encoder 42.

Thus, in the case where there is little margin in the capacity because the number of simultaneous users of the CDMA system exceeds a predetermined range, selecting the error correcting encoder 43 enables the total number of bits after the error correcting coding to be reduced to $\frac{2}{3}$ of the total number of bits when there is a margin in the capacity of the system. Although the present embodiment comprises a pair of error correcting encoders 42 and 43 whose numbers of additional redundant bits differ from each other, and selects one of them in accordance with the transmission rate, three or more error correcting encoders can be employed whose numbers of additional redundant bits differ from each other, so that one of them is selected to be used in accordance with the transmission rate.

The digital signal output from the error correcting encoder 42 or 43 is input to the bit puncturer 44. The bit puncturer 44 decimates, when the total number of the digital signal per transmission block exceeds a predetermined number of bits, the digital signal in the predetermined procedure so that the total number is reduced below to the predetermined number. For example, it decimates one bit from every 10 bits of the digital signal which have undergone the convolutional coding with a coding rate of $\frac{1}{2}$, thereby setting the coding rate at $\frac{5}{9}$ to reduce the total number of bits.

The digital signal the bit puncturer 44 decimates is supplied to the interleaver 45 where it is interleaved in accordance with the transmission rate information 62 fed from the controller 40. The interleaved signal undergoes the same processings as in the first embodiment by the transmission multiplexer 46, RF transmitting stage 48 and transmission power controller 49, and is transmitted to the party in the form of an RF signal through the duplexer 50 and antenna 51.

On the other hand, the RF signal sent from the party is received by the antenna 51, supplied to the RF receiving stage 52, and converted into a digital signal by the RF receiving stage 52 and received signal disassembler 54 through the same process as in the first embodiment. Receiving the received rate information 63 from the received signal disassembler 54, the controller 40 supplies it to the deinterleaver 55, bit de-puncturer 56, error correcting decoders 57 and 58, and information combiner 59. In addition, it generates control signals for controlling the respective components on the basis of the received rate information 63, and supplies them to these components.

The deinterleaver 55, receiving the digital data from the received signal disassembler 54, deinterleaves them in a procedure opposite to that of the interleave, thereby converting them to the digital signal before the interleave. The deinterleaver 55 supplies the deinterleaved digital signal to the bit de-puncturer 56 which restores the digital data before the decimation by making insertions in locations at which the decimation has been carried out. The interpolated digital signal is supplied to the error correcting decoder 57 or error correcting decoder 58 depending on the received rate information 63 fed from the controller 40.

Receiving the digital data from the bit de-puncturer 56, the error correcting decoder 57 or 58 performs the error correcting decoding thereof, thereby converting it to an error corrected digital signal. The information combiner 59 receives the digital data block by block, and temporarily stores them in its internal buffer. Subsequently, it combines them to recover the original digital signal in accordance with the received rate information 63 fed from the controller 40, and outputs them as the received data 61.

As described above, the second embodiment switches, when making the error correcting coding of the transmitted data, between the pair of error correcting encoders whose numbers of redundant bits differ from each other. This enables the total number of transmitted bits per block to be varied in accordance with the transmitted rate.

Next, a further alternative embodiment of the CDMA transmitter-receiver in accordance with the present invention will be described with reference to FIG. 3. The transmitter-receiver comprises a pair of convolutional encoders with their coding rates and constraint lengths different from each other so that it selects, when the number of users accessing the system increases, the convolutional coder with a smaller coding rate and larger constraint length in response to a command from a base station to reduce the total number of transmitted bits per block and the transmission power thereof. In this case, since the longer constraint length can compensate for degradation in transmission quality due to the reduction in the transmission power, the present embodiment is preferably applied to a system that demands immediacy and cannot adopt retransmission control.

The system of the present embodiment has the same arrangement as the embodiment shown and described with referense to FIG. 2, except that convolutional encoders 72 and 73, and Viterbi decoders 87 and 88 replace the error correcting encoders 42 and 43, and the error correcting decoders 57 and 58 as shown in FIG. 2, respectively. The convolutional encoder 72 makes error correcting coding using a convolutional code with a coding rate of 1/N and a constraint length of K. The convolutional encoder 73, on the other hand, makes error correcting coding using a convolutional code with a coding rate of 1/(N−1) and a constraint length of K+1. The Viterbi decoder 87 decodes the convolutional code with the coding rate of 1/N and constraint length of K, and the Viterbi decoder 88 decodes the convolutional code with the coding rate of 1/(N−1) and constraint length of K+1.

The operation of the system is the same as that of the foregoing embodiment shown in FIG. 2 except that the present embodiment switches between the convolutional encoders 72 and 73 in accordance with the coding rate. For example, when the coding rate is set at a high rate, it switches from the convolutional encoder 72 to the convolutional encoder 73 to increase the coding rate from 1/N to 1/(N−1) and the constraint length from K to K+1. This can prevent the degradation in the transmission quality by compensating for the reduction in the transmission power, which is associated with a decrease in the number of transmitted bits, by increasing the constraint length from K to K+1.

Although the present embodiment employs the pair of convolutional encoders 72 and 73 whose coding rates and constraint lengths differ from each other, it can employ three or more convolutional encoders with their coding rates and constraint lengths different from each other, and selects one of them by switching.

As described above, the embodiment is adapted to select one of the two convolutional encoders, one having a coding rate of 1/N and constraint length of K, and the other having a coding rate of 1/(N−1) and constraint length of K+1, in accordance with the transmission rate when carrying out the error correcting coding of the transmitted data. This enables the total number of bits to be varied in response to the transmission rate without degrading the transmission quality involved in the reduction in the transmission power.

The entire disclosure of Japanese patent application No. 144804/1997 filed on Jun. 3, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A CDMA transmitter-receiver comprising:
   a voice encoder for encoding an input voice signal on a sample by sample basis;
   an information distributor for splitting a signal encoded by said voice encoder into first bits to be subjected to error correcting coding and second bits not to be subjected to error correcting coding;
   an error correcting encoder for carrying out the error correcting coding of said first bits;
   a controller for generating transmission rate information indicative of a number of transmitted bits;
   a transmitting stage for generating a sequence of transmitted bits that contains bits having undergone the error correcting coding and said second bits, and transmitting said sequence of transmitted bits; and
   a transmission power controller for reducing transmission power in accordance with the number of transmitted bits indicated by said transmission rate information when the number of transmitted bits is reduced,
   wherein said information distributor varies the number of said first bits in accordance with the number of transmitted bits indicated by said transmission rate information, and wherein said error correcting encoder changes the number of redundant bits in accordance with the number of bits subjected to the error correcting coding.

2. The CDMA transmitter-receiver in accordance with claim 1, wherein said transmitting stage transmits said sequence of transmitted bits repeatedly when the number of transmitted bits indicated by said transmission rate information is reduced.

3. A CDMA transmitter-receiver comprising:
   a plurality of error correcting encoders for carrying out error correcting coding of input data, said plurality of error correcting encoders having different error correcting capabilities;
   a selector for selecting one of said plurality of error correcting encoders;
   a controller for generating transmission rate information indicative of a number of transmitted bits;
   a transmitting stage for generating a sequence of transmitted bits which contains bits having undergone the error correcting coding, and transmitting said sequence of transmitted bits; and
   a transmission power controller for reducing transmission power in accordance with the number of transmitted bits indicated by said transmission rate information when the number of transmitted bits is reduced,
   wherein said selector selects one of said plurality of error correcting encoders in accordance with the number of transmitted bits indicated by said transmission rate information and brings the selected error correcting encoder into operation.

4. The CDMA transmitter-receiver in accordance with claim 3, further comprising a decimation circuit for decimating a digital signal on which the error correcting coding has been carried out.

5. The CDMA transmitter-receiver in accordance with claim 3, wherein said plurality of error correcting encoders have different coding rates, and wherein an error correcting encoder of a higher coding rate carries out the error correcting coding using a convolutional code with a shorter constraint length.

6. The CDMA transmitter-receiver in accordance with claim 5, further comprising a decimation circuit for decimating a digital signal on which the error correcting coding has been carried out.

7. The CDMA transmitter-receiver in accordance with claim 3, wherein said transmitting stage transmits said sequence of transmitted bits repeatedly when the number of transmitted bits indicated by said transmission rate information is reduced.

8. A method of transmitting data at a variable transmission rate comprising performance of the following steps in a CDMA transmitter-receiver:
   generating transmission rate information indicative of a number of transmitted bits;

coding a voice signal on a sample by sample basis;

selecting, from among bits of a coded voice signal, a set of bits to be subjected to error correcting coding in accordance with the number of transmitted bits indicated by said transmission rate information, said set of bits being selected in order of precedence beginning from an MSB of said bits of said coded voice signal;

carrying out error correcting coding of said set of bits;

transmitting a sequence of transmitted bits which contains bits having undergone the error correcting coding and bits not selected in the step of selecting; and reducing transmission power in accordance with the number of transmitted bits indicated by said transmission rate information when the number of transmitted bits is reduced.

9. The method in accordance with claim 8, wherein said sequence of transmitted bits is transmitted repeatedly when the number of transmitted bits indicated by said transmission rate information is reduced.

10. A method of transmitting data at a variable transmission rate comprising performance of the following steps in a CDMA transmitter-receiver:

varying a number of bits of transmitted data by varying a number of redundant bits by selecting one of a plurality of error correcting encoders with different error correcting capabilities when carrying out error correcting coding of said transmitted data;

transmitting a sequence of transmitted bits which contains bits having undergone said error correcting coding;

generating transmission rate information indicative of a number of transmitted bits; and reducing transmission power in accordance with the number of transmitted bits indicated by said transmission rate information when the number of transmitted bits is reduced, wherein said selecting is carried out in accordance with the number of transmitted bits indicated by said transmission rate information.

11. The method in accordance with claim 10, further comprising the step of decimating the transmitted data having undergone said error correcting coding.

12. The method in accordance with claim 10, wherein said plurality of error correcting encoders are convolutional encoders having different coding rates, and wherein an error correcting encoder of a higher coding rate carries out the error correcting coding using a convolutional code with a shorter constraint length.

13. The method in accordance with claim 12, further comprising the step of decimating the transmitted data having undergone said error correcting coding.

14. The method in accordance with claim 10, wherein said transmitted data are transmitted repeatedly when the number of transmitted bits indicated by said transmission rate information is reduced.

* * * * *